(12) United States Patent
Garnaud et al.

(10) Patent No.: US 11,619,191 B2
(45) Date of Patent: Apr. 4, 2023

(54) BYPASS PROPULSION UNIT, COMPRISING A THRUST REVERSER WITH MOVABLE CASCADES

(71) Applicants: Safran Nacelles, Gonfreville l'Orcher (FR); Safran Aircraft Engines, Paris (FR)

(72) Inventors: Quentin Garnaud, Moissy-Cramayel (FR); Guillaume Glemarec, Moissy-Cramayel (FR); Patrick Boileau, Rond-Point René Ravaud Réau (FR); Ludovic Toupet, Moissy-Cramayel (FR)

(73) Assignees: Safran Nacelles, Gonfreville l'Orcher (FR); Safran Aircraft Engines, Paris (FR)

( * ) Notice: Subject to any disclaimer, the term of this patent is extended or adjusted under 35 U.S.C. 154(b) by 12 days.

(21) Appl. No.: 17/025,019

(22) Filed: Sep. 18, 2020

(65) Prior Publication Data
US 2021/0003097 A1   Jan. 7, 2021

Related U.S. Application Data

(63) Continuation of application No. PCT/FR2019/050606, filed on Mar. 18, 2019.

(30) Foreign Application Priority Data

Mar. 19, 2018   (FR) ..................................... 18/52327

(51) Int. Cl.
*F02K 1/72* (2006.01)
*B64D 29/08* (2006.01)
(Continued)

(52) U.S. Cl.
CPC .............. *F02K 1/72* (2013.01); *B64C 1/1446* (2013.01); *B64C 7/02* (2013.01); *B64D 29/06* (2013.01);
(Continued)

(58) Field of Classification Search
CPC .. F02K 1/72; F02K 1/80; B64D 29/06; B64D 29/08; B64C 1/1446; B64C 7/02
See application file for complete search history.

(56) References Cited

U.S. PATENT DOCUMENTS

| | | | | |
|---|---|---|---|---|
| 3,541,794 A | * | 11/1970 | Bollenbacher | ............ F02K 3/06 239/265.29 |
| 2013/0220435 A1 | * | 8/2013 | James | .................... B64D 29/08 137/15.1 |

(Continued)

FOREIGN PATENT DOCUMENTS

| EP | 0540193 | 5/1993 |
|---|---|---|
| EP | 3205869 | 8/2017 |

(Continued)

OTHER PUBLICATIONS

International Search Report for International Application PCT/FR2019/050606, dated Jul. 9, 2019.

*Primary Examiner* — Andrew H Nguyen
(74) *Attorney, Agent, or Firm* — Burris Law, PLLC

(57) ABSTRACT

A turbofan propulsion assembly includes a thrust reverser with movable flaps. The propulsion assembly further includes an engine and a nacelle surrounding the engine, and the nacelle includes a thrust reverser with sliding cowls and thrust reverser flaps, and an inner structure. The portion of the inner structure positioned perpendicular to the thrust reverser flaps includes two halves that can open toward the exterior of the nacelle cowls.

5 Claims, 2 Drawing Sheets

(51) Int. Cl.
  *B64D 29/06* (2006.01)
  *B64D 7/02* (2006.01)
  *B64C 1/14* (2006.01)
  *B64C 7/02* (2006.01)
  *F02K 1/80* (2006.01)
(52) U.S. Cl.
  CPC ................ *B64D 29/08* (2013.01); *F02K 1/80* (2013.01); *F05D 2220/323* (2013.01)

(56) References Cited

U.S. PATENT DOCUMENTS

2014/0234090 A1    8/2014  Hurlin et al.
2016/0131082 A1*  5/2016  Gormley ................ F02K 1/766
                                                      239/265.19

FOREIGN PATENT DOCUMENTS

FR       2936494     4/2010
FR       2999239     6/2014

* cited by examiner

BYPASS PROPULSION UNIT, COMPRISING A THRUST REVERSER WITH MOVABLE CASCADES

CROSS-REFERENCE TO RELATED APPLICATIONS

This application is a continuation of International Application No. PCT/FR 2019/050606, filed on Mar. 18, 2019, which claims priority to and the benefit of FR 18/52327 filed on Mar. 19, 2018. The disclosures of the above applications are incorporated herein by reference.

FIELD

The present disclosure relates to a bypass propulsion unit, comprising a thrust reverser with movable cascades.

BACKGROUND

The statements in this section merely provide background information related to the present disclosure and may not constitute prior art.

There are known from the prior art thrust reversers with movable cascades, wherein the cascades allowing sending a portion of the thrust generated by the propulsion unit forwards, are movable between a direct jet position, in which they are stowed around the intermediate casing of the engine, and a reverse jet position, in which they have slid downstream of this intermediate casing, allowing implementing the thrust reversal function.

In particular, these thrust reversers with movable cascades address the increasing need for making short propulsion units, allowing optimizing the fuel consumption in particular.

One issue encountered during maintenance operations with such thrust reversers lies in that part of the members of the engine, including equipment, are covered by a cowling inner structure of the engine, often referred to as "IFS", standing for "Inner Fan Structure." The cowling inner structure, which may be considered as being an inner portion of the nacelle of the propulsion unit, constitutes an aerodynamic fairing of the engine and defines the radially internal wall of a cold flow path. Since some members of the engine covered by the cowling inner structure are located opposite the set formed by the connecting rods and the thrust reverser flaps, these members are hard to access during maintenance operations, thereby requiring operations of dismount and remount of the cowling inner structure which are complex and time-consuming.

There is known from the prior document French Pat. No. 2936494 a propulsion unit comprising a thrust reverser where a portion of the thrust reverser cascades and of the cowling inner structure of the engine can be opened by pivoting outwardly for maintenance operations.

Nonetheless, the device disclosed by this prior document cannot be applied to the case of a propulsion unit comprising a thrust reverser with movable cascades, wherein the particular arrangement of the connecting rods and of the thrust reverser flaps requires a quite specific design in order to enable access to some members located between the engine and the cowling inner structure of the engine.

SUMMARY

This section provides a general summary of the disclosure and is not a comprehensive disclosure of its full scope or all of its features.

In one form, the present disclosure provides a bypass propulsion unit, comprising:
an engine, and
disposed around this engine, a nacelle defining a cold flow path, this nacelle including:
a nacelle cradle, intended to be linked to a suspension pylon of said propulsion unit,
a thrust reverser comprising cascades and at least one cowl, slidably mounted relative to the nacelle cradle, as well as thrust reverser flaps and connecting rods for actuating these flaps,
an inner structure wrapping said engine, and defining, with said movable cowl, a portion of said cold flow path,
a bifurcation for the passage of piping extending between said engine and the outside of said nacelle, diametrically opposite to said nacelle cradle,
this propulsion unit being characterized in that:
said thrust reverser comprises two structural half-shrouds disposed downstream of said cascades and secured thereto,
said inner structure comprises two upstream inner half-structures, linked by their ends to said half-shrouds so as to form two half-sections of the cold flow path, these two half-sections being pivotally mounted on said nacelle cradle,
said thrust reverser flaps are hingedly mounted on said half-shrouds,
said connecting rods are hingedly mounted on said thrust reverser flaps and on said upstream inner half-structures,
said bifurcation extends axially over a length substantially corresponding to that of said half-sections of the cold flow path,
said half-sections of the cold flow path are movable between a service position in which they bear on and on either side of said bifurcation, and a maintenance position, in which they are pivoted outwards of the nacelle, enabling access to the portion of the engine located below said upstream inner half-structures.

By employing these features, each half-section of the cold flow path formed by the two structural half-shrouds, the two upstream half-portions of the inner structure, the thrust reverser flaps and the actuating connecting rods of these flaps, constitutes a rigid set which, when pivoted outwards of the nacelle for maintenance operations, moves together all of the members that are likely to hinder access to some portions of the engine.

In addition, this particular arrangement into two half-sections of the cold flow path wherein these half-sections bear on a bifurcation whose axial length may substantially correspond to that of these half-sections, allows keeping a bifurcation with a cross-section that is large enough to enable passage of piping (e.g., conduits, cables, others) between the engine and the nacelle of the propulsion unit, while reducing as much as possible the aerodynamic drag of this bifurcation within the cold flow path.

According to optional features of the propulsion unit according to the present disclosure, the cowl comprises two half-cowls, and the portion of the inner structure located downstream of the upstream inner half-structures includes two downstream inner half-structures, and the half-cowls and the downstream inner half-structures are pivotally mounted respectively on the nacelle cradle between a service position in which the half-cowls and the downstream inner half-structures are respectively joined edge-to-edge downstream of the bifurcation and define a downstream section of the cold flow path, and a maintenance position in which the half-cowls and the downstream inner half-structures are pivoted outwards of the nacelle, enabling access to the portion of the engine located below the downstream inner half-structures.

Based on these features, in the area located downstream of the half-sections of the cold flow path, holding in the closed position, that is to say in the service position of the half-cowls and of the downstream half-portions of the inner structure, does not require any bifurcation: these half-cowls, on the one hand, and these downstream half-portions, on the other hand, can be directly connected to one another by locks, so that it is possible to clear the cold flow path of any obstacle in the area located downstream of the half-sections of the cold flow path.

According to other optional features of the propulsion unit according to the present disclosure, the bifurcation extends axially over a length corresponding substantially to that of the half-sections of the cold flow path.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4:
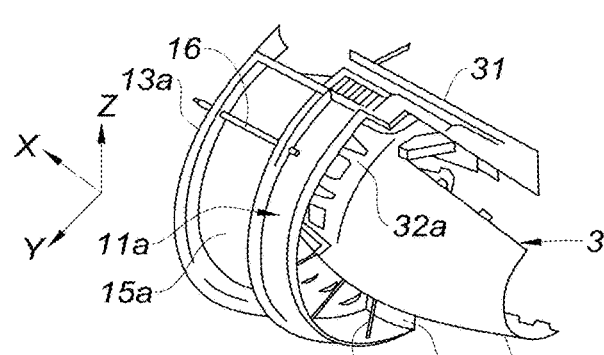
FIGS. 4 and 5 represent, in perspective, the left-side half-section of the cold flow path and the left-side downstream half-portion of the inner structure of the nacelle, respectively, in the service and maintenance positions according to the teachings of the present disclosure.
Figure 5:
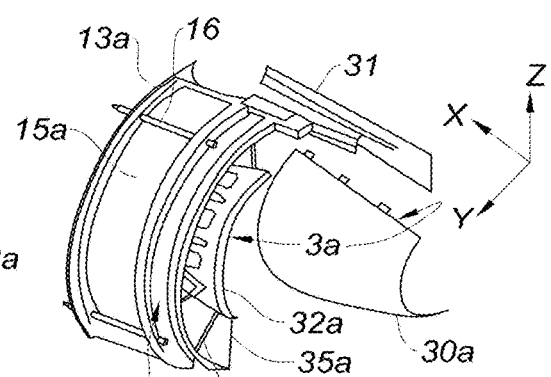
Figure 6A:
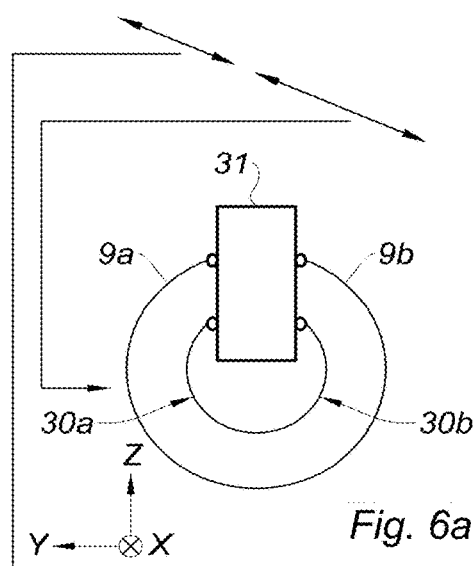
Figure 7A:
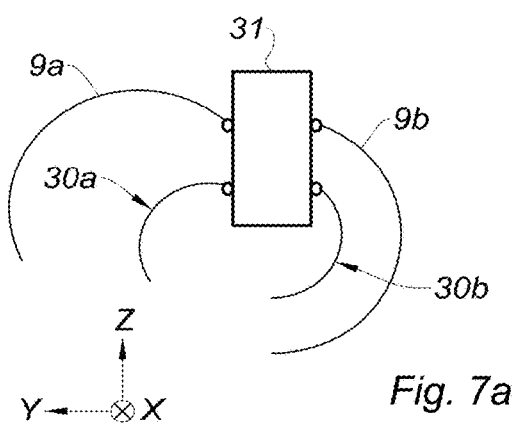
Figure 6B:
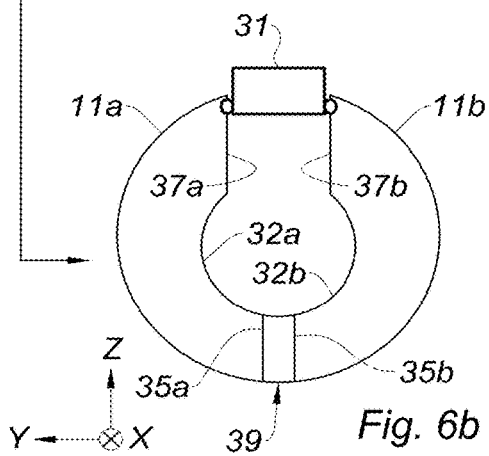
Figure 7B:
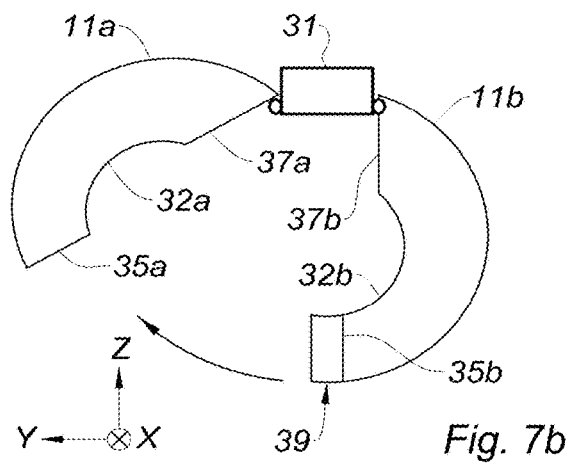

FIGS. 6a and 6b are schematic sectional views of the overall nacelle in the position of FIG. 4, considered respectively in the areas of the downstream half-portions of the inner structure, and of the half-sections of the cold flow path; and FIGS. 7a and 7b are schematic sectional views of the overall nacelle in the position of FIG. 5, considered respectively in the areas of the downstream half-portions of the inner structure, and of the half-sections of the cold flow path.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In addition, and in order to facilitate reading of the orientation of the figures with respect to one another, a trihedron XYZ is placed in each of these figures including the axis X which is coincident with the axis of the propulsion unit and directed from downstream to upstream of this unit, these two terms "downstream" and "upstream" being understood with regards to the circulation of the air flow inside the propulsion unit.

The axis Z corresponds to the vertical direction, and is directed from the bottom upwards, and the transverse plane YZ is perpendicular to the axis X.

Figure 1:
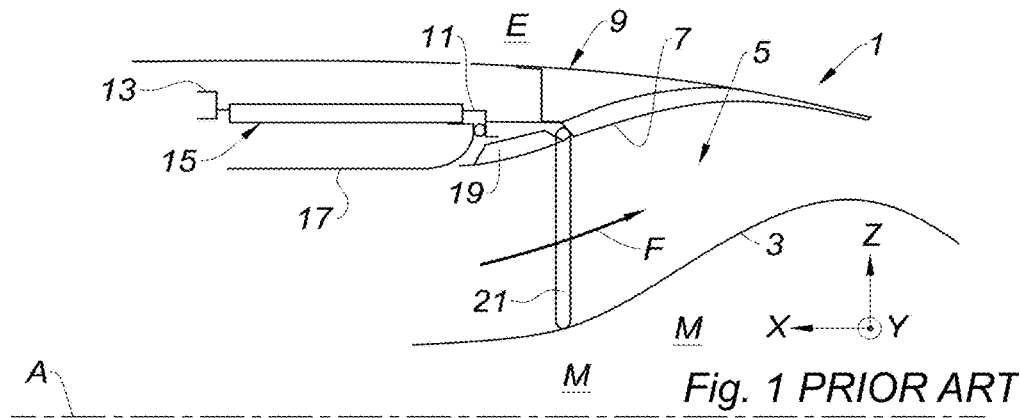
FIGS. 1 and 2 represent, schematically in axial half-sections, the overall principle of operation of a thrust reverser with sliding cascades, respectively in the direct jet and reverse jet positions according to the prior art.
Figure 2:
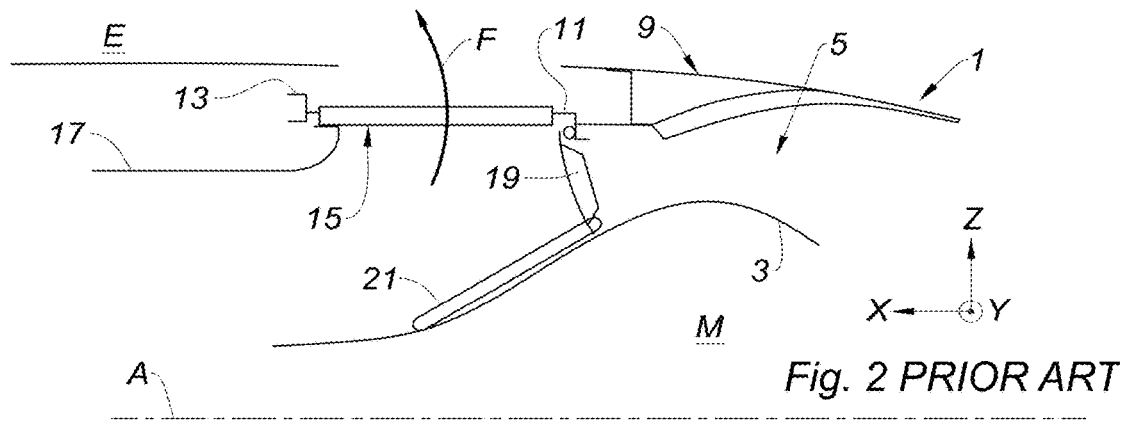

Reference is now made to FIGS. 1 and 2, representing the conventional operation of a thrust reverser with cascades.

As shown in these figures, the propulsion unit 1 comprises, in its central portion, an engine M such as a turbojet engine, with an axis A. This engine M is wrapped by a cowling inner structure 3 (often referred to as "IFS", standing for "Inner Fan Structure"), which provides an aerodynamic fairing of this engine M and defines the radially internal wall of a cold flow path 5 and/or at least a portion of the cold flow path 5.

Conventionally, this cowling inner structure 3 may be made by metallic panels or made of a composite material, and may include an acoustic waves absorption function.

The radially external wall of the cold flow path 5 comprises the radially internal wall 7 of a cowl 9 adapted to slide axially between the direct jet position shown in FIG. 1, and the reverse jet position shown in FIG. 2.

The cowl 9 is rigidly linked to a downstream annular structure 11, often referred to by the terms "rear frame" or "thrust reverser module rear frame", which, in turn, is linked to an upstream annular structure 13, often referred to by the terms "front frame" or "cascades front frame", these two annular structures supporting a series of cascades 15 defining, in turn, an annular arrangement. More specifically, each half 9a or 9b of the cowl 9 is rigidly linked to a corresponding half 11a or 11b of the rear frame 11 of the thrust reverser module, which rear frame 11 is herein formed by two structural half-shrouds, which are disposed downstream of the cascades 15 and secured thereto.

The sliding movement of the set formed by the cowl 9 and the cascades 15 is provided by a plurality of cylinders (one of which bearing the reference numeral 16 is shown in FIGS. 4 and 5) distributed at the periphery of the fixed portion of the propulsion unit, and more particularly at the periphery of the intermediate casing 17 of the fan (not represented) of the propulsion unit. In FIGS. 4 and 5, the cowl 9 has been intentionally omitted for clarity.

Furthermore, a plurality of thrust reverser flaps 19, pivotally mounted on the rear frame 11, substantially over the entire circumference thereof, are linked by connecting rods 21 which, in turn, are hinged on the inner structure 3.

Thus, in the direct jet configuration represented in FIG. 1, these flaps 19 lie in the continuation of the intermediate casing 17 and of the radially internal wall 7 of the cowl 9, and in the reverse jet configuration represented in FIG. 2, these thrust reverser flaps 19 impede the cold flow path 5, compelling the cold air flow F to pass through the cascades 15, and to be redirected outwardly E and upstream of the propulsion unit 1, thereby achieving the thrust reversal function.

For clarity purposes, it might be highlighted herein that, in the propulsion unit 1, one should distinguish two sets which, in practice, are manufactured separately, before being finally assembled together.

Figure 3:
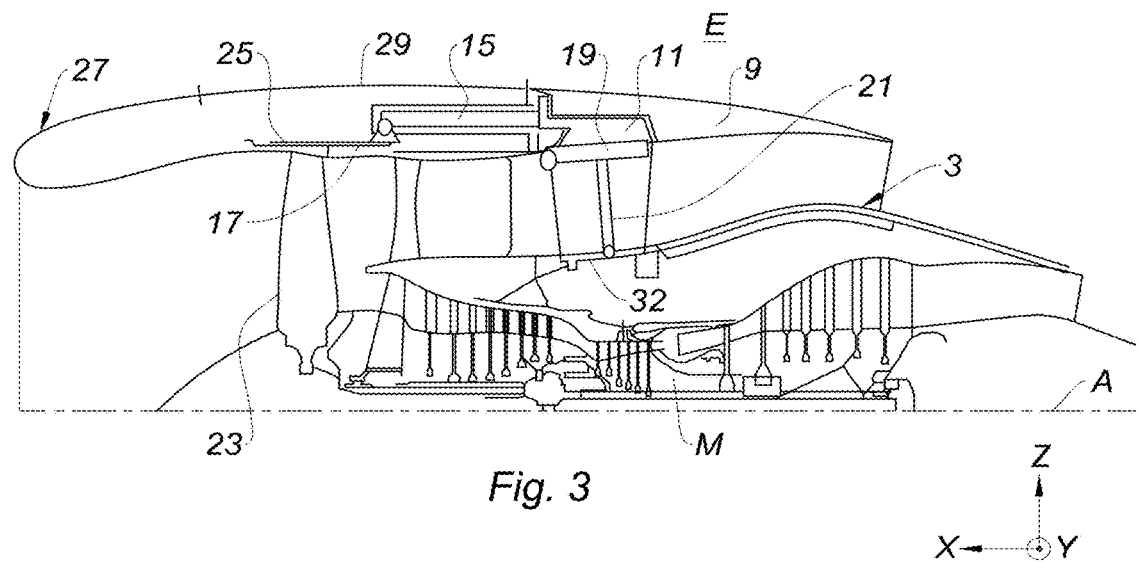
FIG. 3 represents, in axial half-section, a propulsion unit according to the present disclosure, comprising a nacelle and an engine.

The first set is formed by the engine, comprising in particular the engine M itself, as well as the fan 23 (cf. FIG. 3), the fan casing 25 and the intermediate casing 17.

The second set is formed by the nacelle, comprising in particular the air inlet 27 (cf. FIG. 3), the fan casing cowl 29, the inner structure 3, as well as the thrust reversal function, comprising in the current example the sliding cowl 9, the cascades 15 and their associated frames 11 and 13, the thrust reverser flaps 19 and their actuating connecting rods 21.

Also part of the nacelle, and more specifically of a portion of the nacelle often called "nacelle cradle", are two structural half-beams (cf. hereinafter) often referred to by the terms "lateral frames" (namely a right-side frame and a left-side frame) or "monolithic frame" in the case of a one-piece structure.

These two structural half-beams comprise guide rails for sliding of the sliding cowl 9 to which are linked the rear 11 and front 13 frames and the inner structure 3. The two structural half-beams and the guide rails form the nacelle cradle, which is intended to be fastened to a suspension pylon of the propulsion unit, intended, in turn, to be fastened on the wing or on the fuselage of an aircraft.

Referring now more particularly to FIGS. 3, 4, 5, 6*a*, 6*b*, 7*a*, and 7*b*, in which a propulsion unit according to the present disclosure is shown.

As shown in FIGS. 4, 5, 6*a*, 6*b*, 7*a*, and 7*b*, the cascades 15, their front frame 13 and the rear frame 11 of the thrust reverser module, as well as the sliding cowl 9 and the inner structure 3, actually comprise two halves, respectively 15*a*, 11*a*, 11*b*, 13*a*, 9*a*, 9*b*, 30*a*, 30*b*, 32*a*, 32*b* each pivotally mounted on its associated structural half-beam, (these half-beams being referred to by the unique common reference numeral 31 in FIGS. 4, 5, 6*a*, 6*b*, 7*a*, and 7*b*).

More specifically, each rear frame 11 is in the form of a structural half-shroud 11*a*, 11*b*, that is to say a half-belt having a width according to the direction X which is substantially larger than the width of a conventional rear frame: these structural half-shrouds are actually sized so as to provide the strength and the rigidity of what will be described later on as a half-section of the cold flow path.

Each sliding half-cowl 9*a*, 9*b* is detachably fastened to the associated structural half-shroud 11*a*, 11*b*, and the thrust reverser flaps 19 are hingedly mounted on these half-shrouds.

Each inner half-structure 3*a*, 3*b* respectively comprises a downstream inner half-structure 30*a*, 30*b*, and an upstream inner half-structure 32*a*, 32*b*, each of these downstream and upstream inner half-structures can be opened independently of one another by pivoting about its structural half-beam 31, as shown in FIGS. 5, 7*a* and 7*b*.

The upstream inner half-structures 32*a*, 32*b* are disposed opposite the structural half-shrouds 11*a*, 11*b* and the thrust reverser flaps 19, that is to say these inner half-structures, these half-shrouds and these flaps extend axially between substantially common transverse planes (planes YZ).

The actuating connecting rods 21 of the thrust reverser flaps 19 are hinged on the one hand on these flaps and, on the other hand, on the upstream inner half-structures 32*a*, 32*b*.

Moreover, and as shown in particular in FIGS. 6*b* and 7*b*, each half-shroud 11*a*, 11*b* is linked to its associated upstream inner half-structure 32*a*, 32*b* at each one of its ends by respective walls 35*a*, 35*b* and 37*a*, 37*b* extending in planes substantially parallel to the plane XZ, which form two half-sections of the cold flow path 5.

In this manner, each half-set comprising the front half-frame 13*a*, half of the cascades 15*a*, the half-shroud 11*a*, 11*b*, the upstream inner half-structure 32*a*, 32*b*, the linking walls 35*a*, 35*b*, 37*a*, 37*b*, as well as the thrust reverser flaps 19 and the actuating connecting rods 21, form a set that could be referred to as being a half-section of the cold flow path, having its own rigidity.

In particular, this rigidity allows opening these half-sections of the cold flow path outwards of the propulsion unit 1 for maintenance operations, by making them pivot relative to their associated structural half-beam 31 and/or nacelle cradle.

The half-sections of the cold flow path have a cross-section in a transverse plane YZ which looks like the letter "D" that kind of structures thereby being commonly called "D-duct."

Opening of these half-sections of the cold flow path allows accessing the members that are hard to access otherwise, at the periphery of the engine M, such as for example an accessory gearbox (commonly referred to by its acronym AGB) allowing driving various equipment of the propulsion unit in rotation such as pumps or else an electric generator.

Opening of these half-sections of the cold flow path does not require any dismount of the thrust reverser flaps 19 or of the connecting rods 21.

When these half-sections of the cold flow path are in the service position, that is to say in the closed position, they bear on and on either side of the bifurcation 39, which is a fixed portion of the propulsion unit 1 enabling a passage of different piping, such as conduits and cables, between the engine (M) and the outside of the nacelle, diametrically opposite to the nacelle cradle. And the half-sections of the cold flow path, when in a maintenance section, are pivoted outwards of the nacelle, enabling access to the portion of the engine (M) located below the upstream inner half-structures 32*a*, 32*b*.

Holding of the half-sections of the cold flow path in the closed position is performed by means of locks cooperating with this bifurcation 39.

This bifurcation 39 extends axially, that is to say according to the direction X, over a length substantially equal to the width of the half-shrouds 11*a*, 11*b*.

In particular, this means that this bifurcation is interrupted axially at the level of an upstream end edge of the downstream inner half-structures 30*a*, 30*b*, thereby limiting the aerodynamic impact on the circulation of air inside the cold flow path in this area.

When it is further desired to intervene on the portion of the engine located below these downstream inner half-structures 30*a*, 30*b*, which define in the service position a downstream section of the cold flow path, it is proceeded with opening thereof by pivoting about their associated structural half-beams 31, as shown in FIGS. 5 and 7*a*. That is, the two downstream inner half-structures 30*a*, 30*b* and the half-cowls 9*a*, 9*b* are pivotally mounted respectively on the nacelle cradle between a service position in which the half-cowls 9*a*, 9*b* and the downstream inner half-structures 30*a*, 30*b* are respectively joined edge-to-edge downstream of the bifurcation 39 and define a downstream section of the cold flow path 5, and a maintenance position in which the half-cowls 9*a*, 9*b* and the downstream inner half-structures 30*a*, 30*b* are pivoted outwards of the nacelle, enabling access to the portion of the engine M located below the downstream inner half-structures 30*a*, 30*b*

Holding of these downstream inner half-structures 30*a*, 30*b* in the closed position is performed by locking them directly to one another, by means of suitable locks.

The half-cowls 9*a*, 9*b* and the inner fixed half-structures 30*a*, 30*b* have a cross-section in a transverse plane YZ which looks like the letter "C" that kind of structures thereby being commonly called "C-duct."

Of course, the present disclosure is not limited to the described and represented forms and are provided merely as example.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A bypass propulsion unit, comprising:
   an engine; and
   a nacelle disposed around the engine and defining a cold flow path, the nacelle including:
      a nacelle cradle linked to a suspension pylon of the propulsion unit;
      a thrust reverser comprising cascades and at least one cowl, wherein the at least one cowl is slidably mounted relative to thrust reverser flaps, connecting rods, and the nacelle cradle, wherein the connecting rods actuate the thrust reverser flaps;
      an inner structure wrapped around the engine, the inner structure defines, with the at least one cowl, a portion of the cold flow path; and
      a bifurcation for the passage of piping extending between the engine and the outside of the nacelle, diametrically opposite to the nacelle cradle, wherein:
   the thrust reverser of the propulsion unit further comprises two structural half-shrouds disposed downstream of the cascades and secured thereto,
   the inner structure comprises two upstream inner half-structures, ends of the two upstream inner half-structures being linked to the half-shrouds to form two half-sections of the cold flow path, wherein the two half-sections are pivotally mounted on the nacelle cradle,
   the thrust reverser flaps are hingedly mounted on the half-shrouds,
   the connecting rods are hingedly mounted on the thrust reverser flaps and on the upstream inner half-structures, and
   the half-sections of the cold flow path are movable between a service position in which the half-sections of the cold flow path bear on and on either side of the bifurcation, and a maintenance position, in which the half-sections of the cold flow path are pivoted outwards of the nacelle, enabling access to the portion of the engine located below the upstream inner half-structures;
   wherein the at least one cowl further comprises two half-cowls, in that the portion of the inner structure located downstream of the upstream inner half-structures comprises two downstream inner half-structures, and the half-cowls and the downstream inner half-structures are pivotally mounted respectively on the nacelle cradle between a service position in which the half-cowls and the downstream inner half-structures are respectively joined edge-to-edge downstream of the bifurcation and define a downstream section of the cold flow path, and a maintenance position in which the half-cowls and the downstream inner half-structures are pivoted outwards of the nacelle, enabling access to the portion of the engine located below the downstream inner half-structures.

2. The propulsion unit according to claim 1, wherein the bifurcation extends axially over a length corresponding substantially to that of the half-sections of the cold flow path.

3. The propulsion unit according to claim 1, wherein the half-sections of the cold flow path have a D-shaped cross-section in a plane transverse to an axial direction of the nacelle.

4. The propulsion unit according to claim 1, wherein the half-cowls and the downstream inner half-structures have a C-shaped cross-section in a plane transverse to an axial direction of the nacelle.

5. The propulsion unit according to claim 1, further comprising one or more locks configured to hold the half-sections of the cold flow path in the service position cooperating with the bifurcation.

* * * * *